United States Patent
Kemp et al.

(10) Patent No.: US 10,905,119 B2
(45) Date of Patent: Feb. 2, 2021

(54) ANTI-MICROBIAL COMPOSITIONS COMPRISING QUATERNARY ORGANOSILANE COMPOUNDS

(71) Applicant: Q SURGICAL TECHNOLOGIES LTD, Kendal (GB)

(72) Inventors: Andrew Kemp, Kendal (GB); Charles Melville Pillans, Kendal (GB)

(73) Assignee: Q SURGICAL TECHNOLOGIES LTD, Kendal (GB)

( * ) Notice: Subject to any disclaimer, the term of this patent is extended or adjusted under 35 U.S.C. 154(b) by 0 days.

(21) Appl. No.: 16/098,504

(22) PCT Filed: Apr. 24, 2017

(86) PCT No.: PCT/EP2017/059676
§ 371 (c)(1),
(2) Date: Nov. 2, 2018

(87) PCT Pub. No.: WO2017/190972
PCT Pub. Date: Nov. 9, 2017

(65) Prior Publication Data
US 2019/0141997 A1 May 16, 2019

(30) Foreign Application Priority Data
May 3, 2016 (GB) .................... 1607699.4

(51) Int. Cl.
*A01N 33/12* (2006.01)
*A01N 55/00* (2006.01)

(52) U.S. Cl.
CPC ............. *A01N 33/12* (2013.01); *A01N 55/00* (2013.01)

(58) Field of Classification Search
None
See application file for complete search history.

(56) References Cited

U.S. PATENT DOCUMENTS

| | | | | |
|---|---|---|---|---|
| 3,418,355 A | * | 12/1968 | Ruegg | C07C 211/63 558/27 |
| 6,994,890 B2 | * | 2/2006 | Ohlhausen | C09D 4/00 106/2 |
| 2006/0193816 A1 | | 8/2006 | Elfersy et al. | |
| 2007/0065475 A1 | | 3/2007 | Elfersy | |
| 2007/0163964 A1 | | 7/2007 | Williamson et al. | |
| 2007/0237901 A1 | | 10/2007 | Moses et al. | |
| 2011/0293542 A1 | | 12/2011 | Nikawa et al. | |
| 2012/0125226 A1 | * | 5/2012 | Ohlhausen | A01N 33/12 106/2 |

FOREIGN PATENT DOCUMENTS

| | | | |
|---|---|---|---|
| CN | 104798809 A | 7/2015 | |
| JP | 2013-071893 A | 4/2013 | |
| WO | WO-00/54587 A1 | 9/2000 | |
| WO | WO-00/72850 A1 | 12/2000 | |
| WO | WO-0072850 A1 * | 12/2000 | ........... A61K 31/695 |
| WO | WO-2006/086271 A2 | 8/2006 | |
| WO | WO-2009/030640 A1 | 3/2009 | |
| WO | WO-2016/164545 A1 | 10/2016 | |

OTHER PUBLICATIONS

International Search Report & Written Opinion in International Application No. PCT/EP2017/059676, dated Nov. 9, 2017.

* cited by examiner

*Primary Examiner* — Melissa S Mercier
(74) *Attorney, Agent, or Firm* — Foley & Lardner LLP

(57) ABSTRACT

An antimicrobial composition comprising at least two quaternary ammonium compounds selected from: (i) a quaternary ammonium compound having the formula: $A_{4-n}Si(R-NH_aR^1_bZ)n$ and (ii) a quaternary ammonium compound having the formula: $NHcR^1dZ$ wherein in each of the at least two quaternary ammonium compounds A, R, $R^1$, a, Z and n are independently selected, and: A is a member selected from the group consisting of alkoxy radicals, alkylether alkoxy radicals, and alkyl radicals; R is a divalent hydrocarbon radical; each $R^1$ is independently a member selected from the group consisting of benzyl, alkyl radicals, alkyl ether hydrocarbon radicals, hydroxyl-containing alkyl radicals, and nitrogen-containing hydrocarbon radicals; Z is a member selected from the group consisting of chloride, bromide, iodide, tosylate, hydroxide, sulfate and phosphate; a is 0, 1 or 2, b is 1, 2 or 3, and the sum of a and b is 3; c is 0, 1, 2 or 3, d is 1, 2, 3 or 4, and the sum of c and d is 4; and n is 1, 2 or 3; and wherein the composition comprises at least two quaternary ammonium compounds of formula (i). A method of making an anti-microbial composition, and a method of reducing the number of micro-organisms on a surface, are disclosed.

14 Claims, No Drawings

ANTI-MICROBIAL COMPOSITIONS COMPRISING QUATERNARY ORGANOSILANE COMPOUNDS

CROSS-REFERENCE TO RELATED APPLICATIONS

This application is a U.S. National Phase Application under 35 U.S.C. § 371 of International Application No. PCT/EP2017/059676, filed on Apr. 24, 2017, which claims the benefit of priority to GB Application No. 1607699.4, filed on May 3, 2016, the contents of which are incorporated herein by reference in their entirety.

The present invention relates to an anti-microbial composition, a method of making an anti-microbial composition and a method of reducing the number of microbes on a surface using an anti-microbial composition.

Many different substances are known for use of disinfectants, both for use by animals, more particularly humans, and on inanimate surfaces. In particular quaternary ammonium compounds are known for this use.

Although they are beneficial in reducing the number of micro-organisms on a surface, there is a need for improved anti-microbial compositions which will provide improved disinfection.

The present invention seeks to provide an improved anti-microbial composition.

According to the present invention there is provided an antimicrobial composition comprising at least two quaternary ammonium compounds selected from:
(i) a quaternary ammonium compound having the formula:

$$A_{4-n}Si(R—NH_aR^1{}_bZ)_n$$

and
(ii) a quaternary ammonium compound having the formula:

$$NH_cR^1{}_dZ$$

wherein in each of the at least two quaternary ammonium compounds A, R, $R^1$, a, Z and n are independently selected, and:
A is a member selected from the group consisting of alkoxy radicals, alkylether alkoxy radicals, and alkyl radicals;
R is a divalent hydrocarbon radical;
each $R^1$ is independently a member selected from the group consisting of benzyl, alkyl radicals, alkyl ether hydrocarbon radicals, hydroxyl-containing alkyl radicals, and nitrogen-containing hydrocarbon radicals;
Z is a member selected from the group consisting of chloride, bromide, iodide, tosylate, hydroxide, sulfate and phosphate;
a is 0, 1 or 2, b is 1, 2 or 3, and the sum of a and b is 3;
c is 0, 1, 2 or 3, d is 1, 2, 3 or 4, and the sum of c and d is 4; and
n is 1, 2 or 3; and
wherein the composition comprises at least two quaternary ammonium compounds of formula (i).

Preferably, A is a member selected from the group consisting of alkoxy radicals of 1 to 10 carbon atoms, alkylether alkoxy radicals of 2 to 10 carbon atoms, and alkyl radicals with 1 to 10 carbon atoms; and/or
R is a divalent hydrocarbon radical with 1 to 10 carbon atoms; and/or
each $R^1$ is independently a member selected from the group consisting of benzyl, alkyl radicals with 1 to 30 carbon atoms, alkyl ether hydrocarbon radicals of 2 to 30 carbon atoms, hydroxyl-containing alkyl radicals of 1 to 30 carbon atoms, and nitrogen-containing hydrocarbon radicals of 1 to 30 carbon atoms.

Conveniently, the composition comprises two quaternary ammonium compounds of formula (i) and no quaternary ammonium compounds of formula (ii).

Advantageously, the composition comprises two quaternary ammonium compounds of formula (i) and one quaternary ammonium compound of formula (ii).

Preferably, an $R^1$ group of one of the quaternary ammonium compounds, is different from the $R^1$ group or groups of the other quaternary ammonium compound or compounds.

Conveniently, at least one $R^1$ group has 18 carbon atoms.

Advantageously, one of the quaternary ammonium compounds is 3-(trimethoxysilyl) propyl dimethyl octadecyl ammonium chloride.

Preferably, one of the quaternary ammonium compounds is alkyl silyl dimethyl benzyl ammonium chloride.

Conveniently, one of the quaternary ammonium compounds is dioctyl silyl dimethyl ammonium bromide.

Advantageously, the composition comprises water and/or ethanol.

Preferably, the composition comprises the quaternary ammonium compounds in a concentration of from about 0.1 to about 5% by volume, preferably about 0.5 to about 2% by volume.

According to an aspect of the invention, there is provided a method of making an anti-microbial composition as defined in any of the preceding paragraphs, the method comprising admixing the at least two quaternary ammonium compounds.

According to an aspect of the invention, there is provided a method of reducing the number of micro-organisms on a surface, comprising contacting said surface with an antimicrobial composition comprising at least two quaternary ammonium compounds selected from:
(i) a quaternary ammonium compound having the formula:

$$A_{4-n}Si(R—NH_aR^1{}_bZ)_n$$

and
(ii) a quaternary ammonium compound having the formula:

$$NH_cR^1{}_dZ$$

wherein in each of the at least two quaternary ammonium compounds A, R, $R^1$, a, Z and n are independently selected, and:
A is a member selected from the group consisting of alkoxy radicals of 1 to 10 carbon atoms, alkylether alkoxy radicals of 2 to 10 carbon atoms, and alkyl radicals with 1 to 10 carbon atoms;
R is a divalent hydrocarbon radical with 1 to 10 carbon atoms;
each $R^1$ is independently a member selected from the group consisting of benzyl, alkyl radicals with 1 to 30 carbon atoms, alkyl ether hydrocarbon radicals of 2 to 30 carbon atoms, hydroxyl-containing alkyl radicals of 1 to 30 carbon atoms, and nitrogen-containing hydrocarbon radicals of 1 to 30 carbon atoms;
Z is a member selected from the group consisting of chloride, bromide, iodide, tosylate, hydroxide, sulfate and phosphate;
a is 0, 1 or 2, b is 1, 2 or 3, and the sum of a and b is 3;
c is 0, 1, 2 or 3, d is 1, 2, 3 or 4, and the sum of c and d is 4; and
n is 1, 2 or 3; and wherein the composition comprises at least two quaternary ammonium compounds of formula (i).

Advantageously, A is a member selected from the group consisting of alkoxy radicals of 1 to 10 carbon atoms, alkylether alkoxy radicals of 2 to 10 carbon atoms, and alkyl radicals with 1 to 10 carbon atoms;

R is a divalent hydrocarbon radical with 1 to 10 carbon atoms; and each $R^1$ is independently a member selected from the group consisting of benzyl, alkyl radicals with 1 to 30 carbon atoms, alkyl ether hydrocarbon radicals of 2 to 30 carbon atoms, hydroxyl-containing alkyl radicals of 1 to 30 carbon atoms, and nitrogen-containing hydrocarbon radicals of 1 to 30 carbon atoms;

Preferably, the composition is as defined in any of the above paragraphs.

Conveniently, the surface is skin.

Advantageously, the surface is an inanimate surface.

Preferably, the anti-microbial composition is used as a spray, foam, mist, fog or wipes.

The present invention will now be described, by way of example, with reference to the following embodiments.

Quaternary ammonium compounds are widely used as disinfectants. These compounds can remain on surfaces to give a persistent effect, allowing them to remain active on surfaces after cleaning.

Chemically, the quaternary compounds are organically substituted ammonium compounds having four substituents (e.g. alkyl or heterocyclic radicals of a given size or chain length), and an associated anion, such as a halide, sulfate, or similar moiety. These compounds exhibit antimicrobial characteristics. Some known quaternary ammonium compounds used in healthcare are alkyl dimethyl benzyl ammonium chloride, didecyl dimethyl ammonium chloride, dialkyl dimethyl ammonium chloride, didecyl dimethyl ammonium bromide and dioctyl dimethyl ammonium bromide.

The bactericidal action of the quaternary compounds has been attributed to the inactivation of energy-producing enzymes, denaturation of essential cell proteins, and disruption of the cell membrane.

The quaternary compounds used as hospital disinfectants are generally fungicidal, bactericidal, and virucidal against lipophilic (enveloped) viruses. More recent quaternary compounds have been found to have improved efficacy, for example with activity against spores, *Mycobacterium tuberculosis*, and virucidal against hydrophilic (nonenveloped) viruses.

Compositions comprising these antimicrobial compounds are used in ordinary environmental sanitation of surfaces, especially hard surfaces, such as floors, furniture, and walls. Some specific quaternary ammonium compounds are also appropriate to use for disinfecting medical equipment that contacts intact skin (e.g., blood pressure cuffs), and food preparation surfaces.

EXAMPLES

Tests were performed to verify the efficacy of anti-microbial compositions in accordance with the invention. The tests were performed on sample patches of worktop material (2 cm² surface) which were contaminated with a measured amount of a microbe (10,000 CFU *Staph. aureus*). The samples were then subjected to treatment with compositions (compositions 1, 2 and 3 detailed below) followed by testing for the level of microbes with daily cleaning.

Tests were performed with compositions comprising a single silicon-containing quaternary ammonium compound, two silicon-containing quaternary ammonium compounds and three silicon-containing quaternary ammonium compounds. The compounds were used as solutions in a water/ethanol mixture. The concentration of each composition was 1% by volume of the quaternary ammonium compound(s) in 17% ethanol/82% sterile water.

Composition 1 contained 3-(trimethoxysilyl) propyl dimethyl octadecyl ammonium chloride. Composition 2 additionally contained alkyl silyl dimethyl benzyl ammonium chloride. Composition 3 additionally contained dioctyl silyl dimethyl ammonium bromide.

So, Composition 1 contained a single quaternary ammonium compound. Composition 2 contained two quaternary ammonium compounds. Composition 3 contained three quaternary ammonium compounds. All of the quaternary ammonium compounds used in the tests contained silicon.

Comparison of 3 Si Quat Compounds

| Results in CFU per cm² | Day of treatment | | | | |
|---|---|---|---|---|---|
| | 7 days | 14 days | 21 days | 28 days | 3 months |
| 3 × 2 cm² patches of work top contaminated with 10,000 CFU staph aureus and isolated tests performed prior to vigorous daily cleaning | | | | | |
| Before treatment | 9889 | | | | |
| Compound 1 (single Si Quat) | 3 | 3 | 4 | 9 | 167 | 2889 |
| Before treatment | 9878 | | | | |
| Compound 2 (2 × Si Quats) | 0 | 0 | 3 | 3 | 87 | 683 |
| Before treatment | 9920 | | | | |
| Compound 3 (3 × Si Quats) | 0 | 0 | 0 | 0 | 0 | 4 |

The test demonstrates the efficacy of compositions of the invention having improved anti-microbial activity. In particular, the anti-microbial activity is long lived as the composition persists on the surface for a relatively long period of time.

One aspect of the invention is that the composition comprises at least two quaternary ammonium compounds as defined in the claims. At least two of the quaternary ammonium compounds are silicon-containing quaternary ammonium compounds. The quaternary ammonium compounds are defined below, forming an antimicrobial composition comprising at least two quaternary ammonium compounds selected from:

(i) a quaternary ammonium compound having the formula:

$$A_{4-n}Si(R-NH_aR^1{}_bZ)_n$$

and (ii) a quaternary ammonium compound having the formula:

$$NH_cR^1{}_dZ$$

wherein in each of the at least three quaternary ammonium compounds A, R, $R^1$, a, Z and n are independently selected, and:

A is a member selected from the group consisting of alkoxy radicals of 1 to 10 carbon atoms, alkylether alkoxy radicals of 2 to 10 carbon atoms, and alkyl radicals with 1 to 10 carbon atoms;

R is a divalent hydrocarbon radical with 1 to 10 carbon atoms;

each $R^1$ is independently a member selected from the group consisting of benzyl, alkyl radicals with 1 to 30 carbon atoms, alkyl ether hydrocarbon radicals of 2 to 30 carbon atoms, hydroxyl-containing alkyl radicals of 1 to 30 carbon atoms, and nitrogen-containing hydrocarbon radicals of 1 to 30 carbon atoms;

Z is a member selected from the group consisting of chloride, bromide, iodide, tosylate, hydroxide, sulfate and phosphate;

a is 0, 1 or 2, b is 1, 2 or 3, and the sum of a and b is 3;

c is 0, 1, 2 or 3, d is 1, 2, 3 or 4, and the sum of c and d is 4; and n is 1, 2 or 3; and wherein the composition comprises at least two quaternary ammonium compounds of formula (i).

The compounds of formula (i) are silicon-containing ammonium quaternary compounds. The compounds of formula (ii) are quaternary ammonium compounds that do not contain silicon. The focus of the invention is based on compositions that contain more than one silicon-containing quaternary ammonium compound. The applicants have found that there are several advantages to such compositions over prior art compositions. A combination of silicon-containing quaternary ammonium compounds provides more effective anti-microbial action, both in terms of immediate effect and also long lasting (persistent) effect. The use of more than one silicon-containing quaternary ammonium compound allows for more effective cleaning. In addition to the combination of silicon-containing ammonium quaternary compounds, the compositions of the invention can also contain further components. These further components can include quaternary ammonium compounds that do not contain silicon, and/or other components, such as surfactants.

Preferred compositions contain quaternary compounds in which, independently, A is a member selected from the group consisting of alkoxy radicals of 1 to 10 carbon atoms, alkylether alkoxy radicals of 2 to 10 carbon atoms, and alkyl radicals with 1 to 10 carbon atoms; and/or R is a divalent hydrocarbon radical with 1 to 10 carbon atoms; and/or each $R^1$ is independently a member selected from the group consisting of benzyl, alkyl radicals with 1 to 30 carbon atoms, alkyl ether hydrocarbon radicals of 2 to 30 carbon atoms, hydroxyl-containing alkyl radicals of 1 to 30 carbon atoms, and nitrogen-containing hydrocarbon radicals of 1 to 30 carbon atoms.

Preferred compositions contain at least three quaternary ammonium compounds, of which at least two are silicon-containing quaternary compounds as defined in formula (i) above.

Compositions of the invention include compositions comprising two silicon-containing quaternary ammonium compounds of formula (i) and no quaternary ammonium compounds of formula (ii); two quaternary ammonium compounds of formula (i) and one quaternary ammonium compound of formula (ii); two silicon-containing quaternary ammonium compounds of formula (i) and two silicon-containing quaternary ammonium compounds of formula (ii); two silicon-containing quaternary ammonium compounds of formula (i) and three quaternary ammonium compounds of formula (ii); three silicon-containing quaternary ammonium compounds of formula (i) and no quaternary ammonium compounds of formula (ii); three silicon-containing quaternary ammonium compounds of formula (i) and one quaternary ammonium compound of formula (ii); three silicon-containing quaternary ammonium compounds of formula (i) and two quaternary ammonium compounds of formula (ii); three silicon-containing quaternary ammonium compounds of formula (i) and three quaternary ammonium compounds of formula (ii); and so on.

The applicants have found that a composition comprising a mixture of quaternary ammonium compounds of the invention (containing at least two silicon-containing ammonium quaternary compounds) is particularly effective at reducing and eliminating the number of micro-organisms on a surface. Preferably the ammonium compounds have a mixture of long chain groups. At least two of the quaternary ammonium compounds in the composition are silicon containing quaternary ammonium compound (i.e. a compound of formula (i) as set out above).

As used herein the term micro-organism refers to a pathogen such as a virus or bacteria. Preferably, the micro-organism is a bacteria. A non-exhaustive list of pathogens is given below:

Bacteria:
Gram Positive Bacteria:
*Citrobacter freundii*
*Citrobacter diversus*
*Corynebacterium diptheriae*
*Diplococcus pneumoniae*
*Micrococcus* sp. (I)
*Micrococcus* sp. (II)
*Micrococcus* sp. (III)
*Mycobacterium* spp.
*Staphylococcus albus*
*Staphylococcus aureus*
*Staphylococcus citrens*
*Staphylococcus epidermidis*
*Streptococcus faecalis*
*Streptococcus pyogenes*
Gram Negative Bacteria:
*Acinetobacter calcoaceticus*
*Enterobacter aerogenes*
*Enterobacter aglomerans* (I)
*Enterobacter aglomerans* (II)
*Escherichia coli*
*Klebsiella pneumoniae*
*Nisseria gonorrhoeae*
*Proteus mirabilis*
*Proteus morganii*
*Proteus vulgaris*
*Providencia* spp.
*Pseudomonas*
*Pseudomonas aeruginosa*
*Pseudomonas fragi*
*Salmonella choleraesuis*
*Salmonella enteritidis*
*Salmonella gallinarum*
*Salmonella paratyphi A*
*Salmonella schottmuelleri*
*Salmonella typhimurium*
*Salmonella typhosa*
*Serratia marcescens*
*Shigella flexnerie* Type II
*Shigella sonnei*
*Virbrio cholerae*
Viruses:
Adenovirus Type IV
*Feline Pneumonitis*
Herpes Simplex Type I & II
HIV-1 (AIDS)

Influenza A (Japan)
Influenza A2 (Aichi)
Influenza A2 (Hong Kong)
Norovirus
Parinfluenza (Sendai)
Poliovirus
Reovirus
Respiratory Synctia
Fungi and Mould:
*Alternaria alternate*
*Asperigillus niger*
*Aureobasidium pullulans*
*Candida albicans*
*Cladosporium cladosporioides*
*Drechslera australiensis*
*Gliomastix cerealis*
*Microsporum audouinii*
*Monilia grisea*
*Phoma fimeti*
*Pithomyces chartarum*
*Scolecobasidium humicola*
*Trychophyton interdigitale*
*Trychophyton mentagrophytes*

The compositions of the invention generally contain the quaternary ammonium compounds in a solvent. The solvent is preferably aqueous, and more preferably a mixture of water and alcohol, preferably ethanol. The composition may contain methanol, for example as a stabiliser.

The terminology used herein is for describing particular embodiments and is not intended to be limiting.

The term "pathogen" as used herein also includes gram positive and gram negative bacteria, viruses and fungi, including yeasts and moulds.

The term "alkyl" as used herein refers to a straight chain or branched saturated hydrocarbon.

The term "alkylether alkoxy" as used herein refers to an alkyl ether moiety containing carbon-oxygen-carbon bonds and having a terminal oxygen atom bonded to the silicon atom.

The term "alkyl ether" group as used herein refers to an alkyl group as defined above containing within the carbon chain a carbon-oxygen-carbon linkage. Polyethers are also included in this definition as being alkyl groups containing more than one carbon-oxygen-carbon linkage.

The term "alkoxy" as used herein refers to alkyl groups defined as above which have a terminal carbon-oxygen linkage. "Lower" used herein in reference to alkyl, alkoxy and alcohols, indicates species and compounds having 1 to 4 carbons.

The term "antimicrobial" as used herein is used in reference to the ability of the compound composition or article to eliminate, remove, inactivate, kill or reduce microorganisms such as bacteria, viruses, fungi, moulds, yeasts and spores. The term antimicrobial as used herein to imply reduction and elimination of the growth and formation of microorganisms such as described above.

The compositions of the invention can be used in many different applications in order to reduce and/or eliminate the number of pathogens. In particular they can be used on inanimate surfaces. They can be used in healthcare environments, in the home and other situations in order to disinfect surfaces. Such applications include the food industry, water treatment and hospitals. The Applicants have found that the application of the composition to a surface reduces substantially the number of pathogens within a very short period of time. In addition, the composition produces a long-lasting pathogenic effect from the application of the composition to a surface. The quaternary ammonium compounds of the compositions of the invention persist on the surface even if they are subjected to normal use, for a period of time. The compositions have been found to be effective against viruses, and against norovirus in particular.

The anti-microbial compositions of the invention may be used in many different ways. Preferably, the composition of the invention is a liquid. For example, the composition could be used as a spray, to be sprayed onto surfaces. The surfaces are then either be left for the composition to dry, or the composition may be wiped with a clean cloth or other implement and then left to dry. The composition of the invention can also be provided as a foam, to be applied to a surface. The composition could be released from a container which forms the foam, for example by entraining air. The composition may optionally contain components to aid in the formation of the foam. The composition of the invention may also be used in the form of a wetted wipe. So, a wipe impregnated with the composition may be used to wipe a surface. Another way of applying the composition is through the generation of a fog. In other words, small liquid particles of the composition of the invention may be formed to generate a mist or fog, which can then contact surfaces to be disinfected.

It is believed that the compositions of the invention become more effective some time after being applied to a surface and left to dry. Without being bound by theory, the Applicants believe that at least some of the components of the composition may become bonded to the surface, giving a long lasting persistent anti-microbial effect. This could be, in the case of a silicon-containing quaternary ammonium compound, hydrolysis in the formation of a bond with the material of the surface being disinfected.

It is believed that the mix of at least two different quaternary ammonium compounds is a factor in the efficacy of the compositions of the invention. In particular, it is believed that having different organic groups, especially of different chain lengths, enhances efficacy.

The compounds of the invention contain at least two different quaternary ammonium compounds, of which at least two are silicon-containing quaternary ammonium compounds as defined in formula (i) in the claims. Preferably, the composition contains at least two quaternary ammonium compounds, each having at least one pendant group having at least eight carbon atoms. More preferably, each of the at least two quaternary ammonium compounds has such an organic moiety which has a different chain length from the other groups in the other quaternary ammonium compounds in the composition.

It is preferred for the quaternary ammonium compounds used in the invention to be provided in an aqueous solvent. Although the solvent could be essentially water, it is preferred that the solvent comprises water and an alcohol, such as ethanol. This reduces the drying time of the composition when applied to a surface. If desired, the composition can contain other optional components.

Compositions of the invention can be made, for example, by admixing the at least two quaternary ammonium compounds with a solvent. The compositions may be provided in a concentration which is ready to use, or may be provided in the concentrated form, ready for dilution to a more appropriate concentration when needed.

In addition to disinfecting inanimate surfaces, the compositions of the invention could be used to disinfect a surface of the living body, for example the skin.

The invention claimed is:

1. An antimicrobial composition comprising at least two quaternary ammonium compounds of formula (i) and at least one quaternary ammonium compound of formula (ii):
   (i) a quaternary ammonium compound of formula (i) having the formula:

$$A_{4-n}Si(R\text{---}NH_aR^1{}_bZ)_n$$

and
   (ii) a quaternary ammonium compound of formula (ii) having the formula:

$$NH_cR^1{}_dZ$$

wherein in each of the quaternary ammonium compounds of formula (i) and formula (ii) A, R, $R^1$, a, Z and n are independently selected, and:
   A is a member selected from the group consisting of alkoxy radicals, alkylether alkoxy radicals, and alkyl radicals;
   R is a divalent hydrocarbon radical;
   each $R^1$ is independently a member selected from the group consisting of benzyl, alkyl radicals, alkyl ether hydrocarbon radicals, hydroxyl-containing alkyl radicals, and nitrogen-containing hydrocarbon radicals;
   Z is a member selected from the group consisting of chloride, bromide, iodide, tosylate, hydroxide, sulfate and phosphate;
   a is 0, 1 or 2, b is 1, 2 or 3, and the sum of a and b is 3;
   c is 0, 1, 2 or 3, d is 1, 2, 3 or 4, and the sum of c and d is 4; and
   n is 1, 2 or 3; and
   wherein:
      the compounds of formula (i) and (ii) are in a 2:1 ratio; and
      the total concentration of the compounds of formula (i) and (ii) is from about 0.1 to about 5% by volume.

2. The composition of claim 1, wherein;
   A is a member selected from the group consisting of alkoxy radicals of 1 to 10 carbon atoms, alkylether alkoxy radicals of 2 to 10 carbon atoms, and alkyl radicals with 1 to 10 carbon atoms; and/or
   R is a divalent hydrocarbon radical with 1 to 10 carbon atoms; and/or
   each $R^1$ is independently a member selected from the group consisting of benzyl, alkyl radicals with 1 to 30 carbon atoms, alkyl ether hydrocarbon radicals of 2 to 30 carbon atoms, hydroxyl-containing alkyl radicals of 1 to 30 carbon atoms, and nitrogen-containing hydrocarbon radicals of 1 to 30 carbon atoms.

3. The composition of claim 1, wherein an $R^1$ group of one of the quaternary ammonium compounds, is different from the $R^1$ group or groups of the other quaternary ammonium compound or compounds.

4. The composition of claim 1, wherein at least one $R^1$ group has 18 carbon atoms.

5. The composition of claim 1, wherein one of the quaternary ammonium compounds of formula (i) is 3-(trimethoxysilyl) propyl dimethyl octadecyl ammonium chloride.

6. The composition of claim 1, wherein one of the quaternary ammonium compounds of formula (i) is alkyl silyl dimethyl benzyl ammonium chloride.

7. The composition of claim 1, wherein one of the quaternary ammonium compounds of formula (i) is dioctyl silyl dimethyl ammonium bromide.

8. The composition of claim 1 further comprising water and/or ethanol.

9. A method of making the anti-microbial of claim 1, the method comprising admixing the quaternary ammonium compounds of formula (i) and formula (ii).

10. A method of reducing the number of micro-organisms on a surface, the method comprising contacting said surface with an antimicrobial composition comprising at least two quaternary ammonium compounds of formula (i) and at least one quaternary ammonium compound of formula (ii):
   (i) a quaternary ammonium compound of formula (i) having the formula:

$$A_{4-n}Si(R\text{---}NH_aR^1{}_bZ)_n$$

and
   (ii) a quaternary ammonium compound of formula (ii) having the formula:

$$NH_cR^1{}_dZ$$

wherein in each of the quaternary ammonium compounds of formula (i) and formula (ii) A, R, $R^1$, a, Z and n are independently selected, and:
   A is a member selected from the group consisting of alkoxy radicals, alkylether alkoxy radicals, and alkyl radicals;
   R is a divalent hydrocarbon radical;
   each $R^1$ is independently a member selected from the group consisting of benzyl, alkyl radicals, alkyl ether hydrocarbon radicals, hydroxyl-containing alkyl radicals, and nitrogen-containing hydrocarbon radicals;
   Z is a member selected from the group consisting of chloride, bromide, iodide, tosylate, hydroxide, sulfate and phosphate;
   a is 0, 1 or 2, b is 1, 2 or 3, and the sum of a and b is 3;
   c is 0, 1, 2 or 3, d is 1, 2, 3 or 4, and the sum of c and d is 4; and
   n is 1, 2 or 3; and
   wherein:
      the compounds of formula (i) and (ii) are in a 2:1 ratio; and
      the total concentration of the compounds of formula (i) and (ii) is from about 0.1 to about 5% by volume.

11. The method of claim 10, wherein the surface is skin.

12. The method of claim 10, wherein the surface is an inanimate surface.

13. The method of claim 10, wherein the anti-microbial composition is a spray, foam, mist, fog, or wipe.

14. The composition of claim 1 comprising the quaternary ammonium compounds in a concentration of from about 0.5 to about 2% by volume.

* * * * *